(12) United States Patent
Hagiwara et al.

(10) Patent No.: US 8,754,160 B2
(45) Date of Patent: Jun. 17, 2014

(54) METHOD FOR PRODUCING SILICONE RUBBER COMPOUND AND SILICONE RUBBER COMPOSITION

(75) Inventors: Yutaka Hagiwara, Annaka (JP); Minoru Igarashi, Annaka (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 131 days.

(21) Appl. No.: 13/457,828

(22) Filed: Apr. 27, 2012

(65) Prior Publication Data

US 2012/0277371 A1 Nov. 1, 2012

(30) Foreign Application Priority Data

Apr. 28, 2011 (JP) ................................. 2011-100530

(51) Int. Cl.
*C08K 3/34* (2006.01)
*C08L 83/00* (2006.01)

(52) U.S. Cl.
USPC .......................................... 524/493; 524/588

(58) Field of Classification Search
USPC ....................................................... 524/493
See application file for complete search history.

(56) References Cited

U.S. PATENT DOCUMENTS

| | | | |
|---|---|---|---|
| 5,378,788 A | 1/1995 | Omura et al. | |
| 5,597,853 A | 1/1997 | Itoh et al. | |
| 5,866,640 A * | 2/1999 | Honma et al. | 523/212 |

FOREIGN PATENT DOCUMENTS

| | | | | |
|---|---|---|---|---|
| EP | 0 767 207 A1 | 4/1997 | | |
| JP | 9-40868 A | 2/1997 | | |
| JP | 9-95612 A | 4/1997 | | |
| JP | 2652307 B2 | 9/1997 | | |
| JP | 2853539 B2 | 2/1999 | | |
| JP | 2003221507 A * | 8/2003 | ............. | C08L 83/07 |
| JP | 2004-189818 A | 7/2004 | | |
| JP | 2007-153991 A | 6/2007 | | |

OTHER PUBLICATIONS

Translation of JP 2003-221507, Aug. 2003.*

* cited by examiner

*Primary Examiner* — Hui Chin
(74) *Attorney, Agent, or Firm* — Birch, Stewart, Kolasch & Birch, LLP

(57) ABSTRACT

A method for producing a silicone rubber compound in a reduced blending time, and which imparts excellent resistance to plasticity reversion and the cured silicone rubber prepared without heat treatment has excellent resistance to compression set. (A) an organopolysiloxane with polymerization degree of at least 100 represented by the following average compositional formula (I):

$$R^1_a SiO_{(4-a)/2} \qquad (I)$$

($R^1$: a substituted or unsubstituted monovalent hydrocarbon group, a: 1.95 to 2.05), (B) a reinforcing silica having a specific surface area (BET) of at least 50 m²/g, and (C) a preliminary hydrolysis product of (C-1) an alkoxysilane represented by the following formula (II):

$$R^2_m Si(OR^3)_{4-m} \qquad (II)$$

($R^2$: hydrogen atom or a substituted or unsubstituted monovalent hydrocarbon group, $R^3$: a substituted or unsubstituted alkyl group, m: 0, 1, 2, or 3), and (C-2) water at a molar amount 0.3 to 5 times the alkoxy group in the alkoxysilane of component (C-1) are mixed and heated.

9 Claims, No Drawings

METHOD FOR PRODUCING SILICONE RUBBER COMPOUND AND SILICONE RUBBER COMPOSITION

CROSS-REFERENCE TO RELATED APPLICATION

This non-provisional application claims priority under 35 U.S.C. §119(a) on Patent Application No. 2011-100530 filed in Japan on Apr. 28, 2011, the entire contents of which are hereby incorporated by reference.

TECHNICAL FIELD

This invention relates to a method for producing a silicone rubber compound and a silicone rubber composition which can be prepared in reduced blending time and good resistance to plasticity reversion (creep hardening), and which is capable of producing a cured silicone rubber having good resistance to compression set. This invention also relates to a silicone rubber compound and a silicone rubber composition produced by such method.

BACKGROUND ART

Silicone rubbers have excellent properties including high weatherability and electric properties, reduced compression set, and high heat resistance and cold resistance, and therefore, they are used in wide fields such as electric appliance, automobiles, construction, and foods. Applications include rubber contacts used in a remote controller, typewriter, word processor, computer terminal, musical instrument, and the like; gaskets used in construction; rolls used in copying machines, developing roll, transfer roll, charging roll, paper feed roll and other rolls; vibration control rubber in audio system; packings for compact disks used in computers. Demand for the silicone rubber is increasing, and development of silicone rubbers having improved properties are highly awaited. Silicone rubbers are generally provided in the form of a composition comprising an organopolysiloxane having a high degree of polymerization (starting polymer) and a reinforcing filler. This composition is prepared, for example, by mixing the starting polymer with the reinforcing filler and various dispersants using a mixer such as a kneader or a dual roll (roll mill).

As described above, in the production of the silicone rubber, a reinforcing filler should be kneaded in an organopolysiloxane, and a surface treating agent called "dispersant" is used in this process. When a silica is dispersed in an organopolysiloxane, the surface treating agent used is generally an organosilane or a siloxane having silanol group. Dispersion of the silica in the organopolysiloxane is a time consuming step, and there is an expectation for reducing the time required for the production by reducing the time used for the dispersion.

A straight chain organopolysiloxane having hydroxyl group at opposite ends is generally effective as a dispersant in producing the silicone rubber compound, and various dispersants have been used. Effectiveness and function of the dispersant depends on the content of hydroxyl group, and a polysiloxane having a higher content of the hydroxyl group, namely, a low molecular weight straight chain organosiloxane end capped with hydroxyl group can be used at a lower amount. Such polysiloxane is also more effective in view of the workability of the silicone rubber compound. For example, Japanese Patent No. 2853539 discloses a silicone rubber composition having 1,1,3,3-tetramethyldisiloxane-1,3-diol incorporated therein, and the resulting improvement of plasticity reversion and workability. However, commercial-scale production of the 1,1,3,3-tetramethyldisiloxane-1,3-diol is difficult and the price is accordingly high.

For example, Japanese Patent No. 2853539 discloses a silicone rubber composition having 1,1,3,3-tetramethyldisiloxane-1,3-diol incorporated therein, and the resulting improvement of plasticity reversion and workability. However, commercial-scale production of the 1,1,3,3-tetramethyldisiloxane-1,3-diol is difficult and the price is accordingly high.

Japanese Patent No. 2652307 discloses a method for producing a silanol having a relatively low molecular weight by using an alkoxysilane. This method requires neutralization with a metal oxide, removal of the methanol generated in the process.

JP-A 2004-189818 discloses a silicone rubber composition with reduced plasticity reversion. This document, however, does not describe addition of the water.

SUMMARY OF THE INVENTION

The present invention has been completed in view of the situation as described above, and an object of the present invention is to provide a method for producing a silicone rubber compound and a silicone rubber composition which requires reduced time for the blending and impart good resistance to plasticity reversion and which can be produced into cured silicone rubber having excellent resistance to compression set without high temperature heat treatment such as post-curing after the curing. Another object of the present invention is to provide a silicone rubber compound and a silicone rubber composition produced by this production method.

In order to achieve the objects as described above, the inventors of the present invention conducted an intensive study, and found that, in the preparation of a silicone rubber compound by uniformly mixing an organopolysiloxane (base polymer) having a degree of polymerization of at least 100 with a reinforcing silica, the addition of a hydrolysis product of an alkoxysilane preliminarily hydrolyzed by water to the reaction mixture system allows the hydrolysate of the alkoxysilane to function as a silica wetter thereby enabling reduction of the time required for the blending when the silica is kneaded with the organopolysiloxane (base polymer) and reduction of the plasticity reversion (creep hardening) of the as-produced silicone rubber composition before the curing. A silicone rubber composition obtained by adding a curing agent to the silicone rubber compound can improve the compression set of the primarily cured (press-cured) and post-cured (secondarily cured) silicone rubber, and reduce the hardness difference between the cured silicone rubber after the press-curing and the cured silicone rubber after the post-curing. The present invention has been completed on the bases of such findings.

Accordingly, the present invention provides a method for producing a silicone rubber compound and a silicone rubber composition as well as a silicone rubber compound and a silicone rubber composition prepared by the above method, as described below.

[1] A method for producing a silicone rubber compound comprising the steps of
mixing the components (A) to (C):
(A) 100 parts by weight of an organopolysiloxane having a degree of polymerization of at least 100 represented by the following average compositional formula (I):

$$R^1_a SiO_{(4-a)/2} \qquad (I)$$

wherein $R^1$ is independently a substituted or unsubstituted monovalent hydrocarbon group, and a is a positive number of 1.95 to 2.05, (B) 5 to 100 parts by weight of a reinforcing silica having a specific surface area as measured by BET absorption method of at least 50 m²/g, and (C) a preliminary hydrolysis product of (C-1) 0.1 to 20 parts by weight of an alkoxysilane represented by the following formula (II):

$$R^2_m Si(OR^3)_{4-m} \quad (II)$$

wherein $R^2$ is independently hydrogen atom or a substituted or unsubstituted monovalent hydrocarbon group, $R^3$ is independently a substituted or unsubstituted alkyl group, and m is 0, 1, 2, or 3, and (C-2) water at a molar amount 0.3 to 5 times the amount of the alkoxy group in the alkoxysilane of the component (C-1), and subjecting the mixture to a heat treatment.

[2] A method for producing a silicone rubber compound according to [1] wherein the component (C-1) is a diorganodialkoxysilane.

[3] A method for producing a silicone rubber compound according to [2] wherein the component (C-1) is a dimethoxydimethylsilane.

[4] A method for producing a silicone rubber compound according to any one of [1] to [3] wherein the water of the component (C-2) is an acidic aqueous solution having a pH of 1.0 to 5.0.

[5] A method for producing a silicone rubber composition comprising mixing a curing agent capable of curing the component (A) to the silicone rubber compound obtained by the method of any one of [1] to [4].

[6] The method for producing a silicone rubber composition according to [5] wherein the component (A) is an organopolysiloxane having at least two alkenyl groups and the curing agent is an organic peroxide.

[7] The method for producing a silicone rubber composition according to [5] wherein the component (A) is an organopolysiloxane having at least two alkenyl groups and the curing agent is a combination of an organohydrogenpolysiloxane having at least two hydrogen atoms directly bonded to silicon atoms and a platinum metal-based hydrosilylation catalyst.

[8] A silicone rubber compound produced by the method according to any one of [1] to [4].

[9] A silicone rubber composition produced by the method according to any one of [5] to [7].

ADVANTAGEOUS EFFECTS OF INVENTION

The method for producing the silicone rubber compound and the silicone rubber composition of the present invention enables reduction of the time required for the blending when the silica is kneaded with the organopolysiloxane (base polymer) and reduction of the plasticity reversion (creep hardening) of the as-produced silicone rubber compound before the curing. The silicone rubber composition obtained by adding the curing agent to the silicone rubber compound can improve the compression set of the primarily cured (press-cured) and post-cured (secondarily cured) silicone rubber, and reduce the hardness difference between the cured silicone rubber after the press-curing and the cured silicone rubber after the post-curing.

DESCRIPTION OF THE PREFERRED EMBODIMENTS

Next, the present invention is described in detail.
Component (A)

Component (A) of the present invention is an organopolysiloxane which is the main component (base polymer) in the silicone rubber compound of the present invention. This organopolysiloxane having a degree of polymerization of at least 100 is represented by the following average compositional formula (I):

$$R^1_a SiO_{(4-a)/2} \quad (I)$$

wherein $R^1$ is independently a substituted or unsubstituted monovalent hydrocarbon group and a is a positive number of 1.95 to 2.05.

In the compositional formula (I), $R^1$ is independently a substituted or unsubstituted monovalent hydrocarbon group which typically contains 1 to 12 carbon atoms, and in particular, 1 to 8 carbon atoms. Exemplary such groups include alkyl groups such as methyl group, ethyl group, propyl group, butyl group, hexyl group, and octyl group, cycloalkyl groups such as cyclopentyl group and cyclohexyl group, alkenyl groups such as vinyl group, allyl group, and propenyl group, cycloalkenyl groups such as cyclohexenyl group, aryl groups such as phenyl group and tolyl group, aralkyl groups such as benzyl group and 2-phenylethyl group, and any of such groups having a part or all of its hydrogen atoms substituted with a halogen atom such as fluorine, chlorine, or bromine or a group such as cyano group, for example, chloromethyl group, 3,3,3-trifluoropropyl group, and 2-cyanoethyl group. Among these, the preferred are methyl group, vinyl group, phenyl group, and trifluoropropyl group, and the most preferred are methyl group, vinyl group, and phenyl group.

More specifically, the organopolysiloxane may be the one wherein the repetition of the diorganosiloxane unit $(R^1_2 SiO_{2/2}$, wherein $R^1$ is as defined above) constituting the backbone of the organopolysiloxane solely comprises a repetition of dimethylsiloxane unit, or the one wherein diorganosiloxane unit such as diphenylsiloxane unit, methylphenylsiloxane unit, methylvinylsiloxane unit, or methyl-3,3,3-trifluoropropylsiloxane unit having phenyl group, vinyl group, 3,3,3-trifluoropropyl group, or the like as its substituent is incorporated as a part of the dimethylpolysiloxane structure comprising the repetition of the dimethylsiloxane unit constituting the backbone.

The molecular chain is preferably capped at its both ends with a triorganosiloxy group $(R^1_3 SiO_{1/2})$ such as trimethylsiloxy group, dimethylphenylsiloxy group, vinyldimethylsiloxy group, divinylmethylsiloxy group, or trivinylsiloxy group, or hydroxy diorganosiloxy group $(R^1_2(HO)SiO_{1/2})$ such as hydroxydimethylsiloxy group.

The organopolysiloxane of the component (A) is preferably the one containing at least 2, typically 2 to 50, and preferably 2 to 20 aliphatic unsaturated groups such as alkenyl groups or cycloalkenyl groups, and most preferably vinyl groups per molecule. In this case, 0.01 to 20% by mole, preferably 0.02 to 10% by mole, and more preferably 0.02 to 5% by mole of all $R^1$ is an aliphatic unsaturated group such as alkenyl group. The aliphatic unsaturated group may be bonded to the silicon atom either at the end of the molecular chain or at the intermediate of the molecular chain (not at the end of the molecular chain) or both. However, the aliphatic unsaturated group is preferably bonded at least to the silicon atom at the end of the molecular chain.

Letter a is a positive number of 1.95 to 2.05, preferably 1.98 to 2.02, and more preferably 1.99 to 2.01. With regard to $R^1$, at least 80% by mole, preferably at least 90% by mole, more preferably at least 95% by mole of the $R^1$, and still more preferably all $R^1$ except for the aliphatic unsaturated group is an alkyl group, and in particular, methyl group.

As described above, the organopolysiloxane of the component (A) is preferably a straight chain organopolysiloxane wherein the molecular chain is capped at its ends with a triorganosiloxy group ($R^1_3SiO_{1/2}$) such as trimethylsiloxy group, dimethylphenylsiloxy group, dimethylvinylsiloxy group, methyldivinylsiloxy group, or trivinylsiloxy group or a hydroxydiorganosiloxy group ($R^1_2(HO)SiO_{1/2}$) such as dimethylhydroxysiloxy group, and the backbone comprises a repetition of the diorganosiloxane unit ($R^1_2SiO_{2/2}$). Exemplary organopolysiloxanes which are particularly preferable include those wherein the substituent in the molecule (namely, the substituted or unsubstituted monovalent hydrocarbon group bonded to the silicon atom) is methylvinylpolysiloxane, methylphenylvinylpolysiloxane, methyltrifluoropropylvinylpolysiloxane, or the like.

Such organopolysiloxane may be obtained, for example, by (co)hydrolytic condensation of one or more types of organohalogenosilane, or ring-opening polymerization of a cyclic polysiloxane (trimer, tetramer, or the like of the siloxane) using an alkaline or acidic catalyst. While the diorganopolysiloxane prepared by such method is basically a straight chain diorganopolysiloxane, the component (A) may also be a mixture of two or more types of organohalogenosilane each having different molecular weight (degree of polymerization) or different molecular structure.

The organopolysiloxane may have a degree of polymerization of at least 100 (and typically 100 to 100,000), preferably 1,000 to 100,000, more preferably 2,000 to 50,000, and most preferably 3,000 to 20,000, and the organopolysiloxane is preferably non-self flowable, namely in raw rubber-like (non-liquid) state at room temperature (25° C.). When the degree of polymerization is too low, the surface after compounding will exhibit tackiness, and this will invite loss of workability. On the other hand, excessively high degree of polymerization will lead to difficulty in the silica dispersion in the organopolysiloxane or undesirable thickening of the compound resulting in the poor workability in the kneading. The degree of polymerization may be measured as a weight average degree of polymerization in terms of polystyrene by gel permeation chromatography (GPC) using toluene for the solvent.

Component (B)

The reinforcing silica of the component (B) is added for the purpose of obtaining a silicone rubber compound having a high mechanical strength. For this purpose, the reinforcing silica should have a specific surface area (as measured by BET method) of at least 50 m²/g, and the specific surface area is preferably 100 to 450 m²/g, and more preferably 100 to 300 m²/g. When the specific surface area is less than 50 m²/g, the cured product will have poor mechanical strength, while the use of the reinforcing silica having an excessively high specific surface area will be economically disadvantageous since a large amount of wetter is required for the treatment of the silanol group on the silica surface.

Examples of such reinforcing silica include fumed silica (dry silica) and precipitated silica (wet silica), or any of such silica having its surface hydrophobicized with an organochlorosilane such as trimethylchlorosilane, dimethyldichlorosilane, or methyl trichlorosilane or an organosilazane such as hexamethyldisilazane. Of these, the preferred is surface treated or untreated fumed silica having excellent dynamic fatigue properties. The component (B) may comprise single compound or a combination of two or more compounds.

The reinforcing silica of the component (B) is preferably incorporated at an amount of 5 to 100 parts by weight, and more preferably at 10 to 50 parts by weight in relation to 100 parts by weight of the organopolysiloxane of the component (A). The reinforcement effects are not realized when the component (B) is incorporated at an excessively small amount, while excessive incorporation results in the poor workability and mechanical strength as well as loss of dynamic fatigue durability.

Component (C)

Component (C) is a hydrolyzate mixture of an alkoxysilane (C-1) and water (C-2) as described below, and the hydrolyzate mixture contains the alcohol generated by the hydrolysis of the alkoxysilane. If necessary, the reaction may be conducted after removing the alcohol under reduced or normal pressure. However, the mixture containing the alcohol can be used with no further processing in the present invention.

Component (C-1)

The component (C-1) of the present invention is an alkoxysilane represented by the following formula (II):

$$R^2_m Si(OR^3)_{4-m} \qquad (II)$$

wherein $R^2$ is independently hydrogen atom or a substituted or unsubstituted monovalent hydrocarbon group, $R^3$ is independently a substituted or unsubstituted alkyl group, and m is 0, 1, 2, or 3.

Examples of the alkoxysilane represented by the formula (II) include organoalkoxysilanes such as organotrialkoxysilanes, diorganodialkoxysilanes, and triorganoalkoxysilanes; trialkoxysilanes wherein $R^2$ is hydrogen atom; and tetraalkoxysilanes wherein m is 0.

In the formula, $R^2$ is hydrogen atom or independently a substituted or unsubstituted monovalent hydrocarbon group. Examples of the substituted or unsubstituted monovalent hydrocarbon group include those as described above for the $R^1$ in the formula (I) of the component (A). $R^2$ is typically the one containing 1 to 8 carbon atoms, and in particular, 1 to 4 carbon atoms, for example, alkyl groups such as methyl group, ethyl group, propyl group, butyl group, hexyl group, and octyl group, cycloalkyl groups such as cyclopentyl group and cyclohexyl group, alkenyl group such as vinyl group, allyl group, and propenyl group, cycloalkenyl group such as cyclohexenyl group, aryl groups such as phenyl group and tolyl group, aralkyl groups such as benzyl group and 2-phenylethyl group, and any one of such groups having a part or all of its hydrogen atoms substituted with a halogen atoms such as fluorine, chlorine, or bromine or a group such as cyano group, such as chloromethyl group, 3,3,3-trifluoropropyl group, and 2-cyanoethyl group. The preferred are methyl group, vinyl group, phenyl group, and trifluoropropyl group, and the most preferred are methyl group, vinyl group, and phenyl group. In view of compatibility with the organopolysiloxane of the component (A), $R^2$ is preferably the same as the substituted or unsubstituted monovalent hydrocarbon group of the component (A).

Examples of the substituted or unsubstituted alkyl group $R^3$ include alkyl groups typically containing 1 to 4 carbon atoms such as methyl group, ethyl group, propyl group, isopropyl group, butyl group, isobutyl group, and tert-butyl group, and alkoxy-substituted alkyl groups such as methoxymethyl group, methoxyethyl group, ethoxymethyl group, and ethoxyethyl group. In view of the hydrolyzability, the preferred are methyl group and ethyl group. In the formula, m is 0, 1, 2, or 3, and preferably 1 or 2.

Examples of such alkoxysilane include dimethoxydimethylsilane, diethoxydimethylsilane, dimethoxydiethylsilane, diethoxydiethylsilane, dimethoxymethylvinylsilane, dimethoxydiphenylsilane, dimethoxymethylphenylsilane, trimethoxymethylsilane, triethoxymethylsilane, trimethoxyvinylsilane, trimethoxyphenylsilane, trimethoxysilane, triethoxysilane, tetramethoxysilane, and tetraethoxysilane. The preferred is a diorganodialkoxysilanes wherein m is 2 such as a dialkyl dialkoxysilane, and the most preferred is dimethoxydimethylsilane.

These alkoxysilanes are relatively inexpensive, and the use of an alkoxysilane for the starting material is economically quite advantageous. The alkoxysilanes as described above may be used alone or in combination of two or more while use of two or more alkoxysilanes as a mixture needs careful treatment since difference in the speed of hydrolysis may result the inconsistent reaction.

Component (C-1) may be used at 0.1 to 20 parts by weight, and preferably, at 1 to 15 parts by weight in relation to 100 parts by weight of the component (A). Use of the alkoxysilane in excessively small amount may result in the excessively high plasticity of the compound, and hence, in the increase in the plasticity reversion (creep hardening), while excessively high content results in the unduly reduced plasticity of the compound, and hence, loss of roll workability due to stickiness of the rolls in the kneading means such as roll mill.

Component (C-2)

The water of the component (C-2) is used for preliminary hydrolysis of the alkoxysilane of the component (C-1), and hence, for preparing the reaction mixture (hydrolysate mixture) of the alkoxysilane of the component (C-1).

This hydrolysis is preferably conducted by using an acidic aqueous solution having a pH of 1.0 to 5.0, and preferably 2.0 to 4.0. Excessively low pH will result in unduly rapid hydrolysis, and the silanol groups generated will undergo condensation to produce a high molecular weight siloxane, which will not effectively act as a surface treating agent for the component (B) in the mixing of the component (A) with the component (B). The excessively low pH may also result in the problem such as rust formation in the apparatus used for mixing of the component (A) with the component (B). When the pH is too high, the catalytic action required for the hydrolysis will not be obtained and the hydrolysis may not proceed.

Examples of the acid used for adjusting the pH include inorganic acids such as hydrochloric acid, sulfuric acid, and nitric acid and organic acids such as formic acid and acetic acid. Among these, the most preferred is hydrochloric acid.

The pH in the hydrolysis may be adjusted by using a basic aqueous solution adjusted to the range of 9.0 to 11.0. Even in such range, the catalytic activity required for the hydrolysis may not be obtained when the pH is near the neutral range. When the pH is too high, the condensation of the resulting silanol groups may occur, and this will result in the reduced surface treating ability for the silica, and hence, in the need for increasing the amount added. Excessively high pH may also invite the problem of rust formation in the apparatus used for mixing.

Examples of the base used for adjusting the pH include sodium hydroxide, potassium hydroxide, and ammonia solution.

The water is preferably used at a molar amount 0.3 to 5 times, preferably at 0.5 to 2.0 times, and most preferably at 1.0 to 1.5 times the alkoxy group of the alkoxysilane of the component (C-1). Use of the water at an amount less than such range may result in the incomplete hydrolysis of the alkoxy group and greatly reduced generation of the hydroxy group. Excessive addition requires removal of the excessive water.

The temperature and the time used for the hydrolysis of the component (C-1) is not particularly limited, and the hydrolysis typically proceeds at room temperature with no need for special heating. The heating, however, may be conducted, and the reaction time may be determined according to the alkoxysilane used, and the reaction temperature. The reaction time is generally in the range of 5 minutes to 2 hours.

While the reaction mixture may be used with the removal of the alcohol byproduct, the reaction mixture may be used as it is with no alcohol removal for the mixing of the component (A) and the component (B).

The reaction mixture, namely, the component (C) may be used at 0.1 to 25 parts by weight, and preferably, at 1 to 20 parts by weight in relation to 100 parts by weight of the component (A). Use of the alkoxysilane in excessively small amount may result in the excessively high plasticity of the compound, and hence, in the increase in the plasticity reversion (creep hardening), while excessively high content may result in the unduly reduced plasticity of the compound, and hence, loss of roll workability due to stickiness of the rolls in the kneading means such as roll mill.

The silicone rubber compound of the present invention can be produced by kneading a predetermined amount of the components (A) to (C) by a dual roll (roll mill), kneader, Banbury mixer, or the like, and more specifically by charging the kneader with components (A) to (C) and kneading the mixture preferably at a temperature of 0 to 100° C. preferably for 10 minutes to 10 hours. In the present invention, the hydrolyzate mixture (the component (C)) functions as a wetter, and the time required for the mixing is thereby reduced.

After mixing the components by the method as described above, the mixture is heat treated typically at a temperature of 100 to 250° C., and more preferably, at a temperature of 150 to 200° C. In the heat treatment of the compound of the present invention, the alcohol produced in the hydrolysis and the water remaining in the mixture are removed. By preparing the silicone rubber compound in such a method, reduction of the plasticity reversion (creep hardening) of the as-produced silicone rubber composition before the curing, improvement of the compression set of the primarily cured (press-cured) and post-cured (secondarily cured) silicone rubber, and reduction of the hardness difference between the cured silicone rubber after the press-curing and the cured silicone rubber after the post-curing are thereby enabled.

The silicone rubber composition is prepared by mixing a curing agent to the silicone rubber compound. The resulting silicone rubber composition may be crosslinked by using an addition reaction or by using an organic peroxide.

The curing agent used is not particularly limited as long as it can cure the component (A). The preferred are those which are known in the art as a rubber curing agent, namely, (i) a combination of an addition (hydrosilylation) curing agent, namely, an organohydrogenpolysiloxane (crosslinking agent) and a hydrosilylation catalyst, or (ii) an organic peroxide.

The organohydrogenpolysiloxane which functions as the crosslinking agent in the addition reaction (hydrosilylation) may be the one having at least 2 hydrogen atoms bonded to the silicon atom (SiH group) per molecule, and a known organohydrogenpolysiloxane represented by the following average compositional formula (III):

$$R^4_b H_c SiO_{(4-b-c)/2} \tag{III}$$

is applicable. In the formula, $R^4$ is a substituted or unsubstituted monovalent hydrocarbon group containing 1 to 8 carbon atoms which is preferably the one not having an aliphatic unsaturated bond. Examples of such $R^4$ include unsubstituted monovalent hydrocarbon groups such as alkyl groups such as methyl group, ethyl group, propyl group, isopropyl group, butyl group, isobutyl group, tert-butyl group, pentyl group, and hexyl group, cycloalkyl groups such as cyclohexyl group, aryl groups such as phenyl group, aralkyl groups such as benzyl group, a substituted monovalent hydrocarbon group having at least a part of the hydrogen atoms in the monovalent hydrocarbon group substituted with a halogen atom or cyano group, for example, a substituted alkyl group such as 3,3,3-trifluoropropyl group or cyanomethyl group. Letters b and c are respectively positive numbers such that b is 0.7 to 2.1 and c is 0.01 to 1.0 with the proviso that b+c is 0.8 to 3.0; and preferably, b is 0.8 to 2.0 and c is 0.10 to 1.0, more preferably 0.18 to 1.0, and still more preferably 0.2 to 1.0, with the proviso that b+c is 1.0 to 2.5.

The organohydrogenpolysiloxane is not particularly limited for its molecular structure, and the molecular structure may be any of straight chain, cyclic, branched, and three dimensional network. The organohydrogenpolysiloxane is preferably the one which is liquid at room temperature having the number of silicon atoms per molecule (or degree of polymerization) of 2 to 300, and in particular, 4 to 200. The hydrogen atom bonded to the silicon atom (SiH group) may be either at the end of the molecular chain or in the side chain (namely, in the molecular chain), or at both, and the number of SiH group per molecule is at least 2 (typically 2 to 300), preferably at least 3 (especially 3 to 200), and more preferably about 4 to 150.

Examples of such organohydrogenpolysiloxanes include
1,1,3,3-tetramethyldisiloxane,
1,3,5,7-tetramethylcyclotetrasiloxane,
methylhydrogencyclopolysiloxane,
methylhydrogensiloxane-dimethylsiloxane cyclic copolymer,
tris(dimethylhydrogensiloxy)methylsilane,
tris(dimethylhydrogensiloxy)phenylsilane,
methylhydrogen polysiloxane having opposite ends capped with trimethylsiloxy group,
dimethylsiloxane-methylhydrogensiloxane copolymer having opposite ends capped with trimethylsiloxy group,
dimethylpolysiloxane having opposite ends capped with dimethylhydrogensiloxy group,
dimethylsiloxane-methylhydrogensiloxane copolymer having opposite ends capped with dimethylhydrogensiloxy group,
methylhydrogensiloxane-diphenylsiloxane copolymer having opposite ends capped with trimethylsiloxy group,
methylhydrogensiloxane-diphenylsiloxane-dimethylsiloxane copolymer having opposite ends capped with trimethylsiloxy group,
cyclic methyl hydrogen polysiloxane,
cyclic methylhydrogensiloxane-dimethylsiloxane copolymer,
cyclic methylhydrogensiloxane-diphenylsiloxane-dimethylsiloxane copolymer,
a copolymer comprising $(CH_3)_2HSiO_{1/2}$ unit and $SiO_{4/2}$ unit,
a copolymer comprising $(CH_3)_2HSiO_{1/2}$ unit and $SiO_{4/2}$ unit and
$(C_6H_5)SiO_{3/2}$ unit, and
any one of such compound wherein a part or all of the methyl group has been substituted with another alkyl group such as ethyl group or propyl group or an aryl group such as phenyl group. Examples of such organohydrogenpolysiloxane include compounds represented by the following formula:

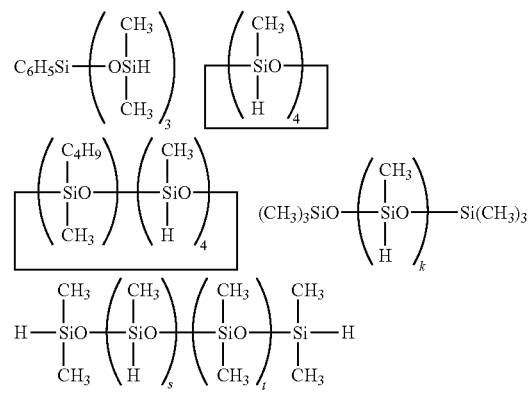

wherein k is an integer of 2 to 10, s and t are respectively an integer of 0 to 10.

The organohydrogenpolysiloxane is preferably the one having a viscosity at 25° C. of 0.5 to 10,000 mPa·s, and in particular, 1 to 300 mPa·s. The viscosity may be measured by using a rotary viscometer.

The organohydrogenpolysiloxane is preferably incorporated at 0.1 to 30 parts by weight, more preferably 0.1 to 10 parts by weight, and still more preferably 0.3 to 10 parts by weight in relation to 100 parts by weight of the organopolysiloxane of the component (A).

The organohydrogenpolysiloxane is preferably incorporated at an amount such that molar ratio of the hydrogen atom bonded to the silicon atom (namely, SiH group) in the organohydrogenpolysiloxane to the aliphatic unsaturated group such as an alkenyl group bonded to the silicon atom in the component (A) (molar ration of the SiH group to the aliphatic unsaturated group) is 0.5 to 10 mol/mol, preferably 0.8 to 6 mol/mol, and more preferably 1 to 5 mol/mol. Incorporation at an amount of less than 0.5 mol/mol leads to insufficient crosslinking, and hence, insufficient mechanical strength, while incorporation in excess of 10 mol/mol may result in the insufficient physical properties after the curing, and in particular, great loss of heat resistance and resistance to compression set.

The hydrosilylation catalyst used in the crosslinking reaction in the addition reaction (hydrosilylation) is a catalyst which promotes addition of the aliphatic unsaturated group (for example, an alkenyl group) in the component (A) with the hydrogen atom bonded to the silicon atom (SiH group) in the organohydrogenpolysiloxane as the crosslinking agent. Examples of the hydrosilylation catalyst include platinum group metal catalysts such as simple metals of the platinum group metal and their compound including convention known catalysts used for the addition curable silicone rubber composition. Exemplary preferable catalysts include fine particle platinum metal adsorbed on a support such as silica, alumina, or silica gel, platinic chloride, chloroplatinic acid, alcohol solution of chloroplatinic acid hexahydrate, palladium catalyst, and rhodium catalyst, and the preferred is platinum or a platinum compound.

The hydrosilylation catalyst may be added at an amount capable of promoting the addition reaction, namely, at a catalytic amount. The hydrosilylation catalyst is typically used at an amount in the range of 1 ppm to 1% by weight, and preferably at 10 to 500 ppm in terms of platinum group metal weight in relation to the component (A). Addition at an amount of less than 1 ppm is insufficient for promoting the addition reaction, and curing may become insufficient.

Amount in excess of 1% by weight may be uneconomical since the effect on the reactivity is saturated at an amount in excess of such range.

In addition to the catalyst as described above, an agent for controlling the addition and crosslinking may be used for the purpose of adjusting the curing speed. Exemplary such agents include ethynylcyclohexanol and tetramethyltetravinylcyclotetrasiloxane.

Examples of the organic peroxide (ii) include
benzoyl peroxide, 2,4-dichlorobenzoyl peroxide,
p-methyl benzoyl peroxide, o-methylbenzoyl peroxide,
2,4-dicumyl peroxide,
2,5-dimethyl-bis(2,5-t-butylperoxy)hexane,
di-t-butyl peroxide, t-butyl perbenzoate, and
1,6-hexanediol-bis-t-butylperoxy carbonate.

The organic peroxide may be added at an amount of 0.1 to 15 parts by weight, and in particular, at 0.2 to 10 parts by weight in relation to 100 parts by weight of the component (A). Insufficient addition of the organic peroxide may invite insufficient promotion of the crosslinking, and hence, loss of physical properties such as poor hardness, insufficient rubber strength, and increased compression set. Excessive addition is not only economically disadvantageous, but also disadvantageous in view of increased degradation product of the curing agent which results in the loss of physical properties such as increased compression set and increased discoloration of the resulting sheet.

The silicone rubber compound and the silicone rubber composition of the present invention may also contain an electroconductivity-imparting agent such as carbon black, a flame retardant such as iron oxide or halogen compounds, a softener, an antiaging agent, a UV absorbent, a colorant, and the like in addition to the components as described above to the extent not adversely affecting the purpose of the present invention.

Cured silicone rubber can be produced from the thus obtained silicone rubber composition of the present invention by curing at 80 to 300° C., and in particular, 100 to 200° C. for 5 seconds to 1 hour, and in particular, 30 seconds to 30 minutes to produce cured silicone rubber. The silicone rubber composition of the present invention can be produced into a cured silicone rubber product having excellent resistance to compression set without high temperature heat treatment such as post-curing after the curing.

EXAMPLES

Next, the present invention is described in further detail by referring to Examples and Comparative Examples, which by no means limit the scope of the present invention. Unless otherwise noted, the "part" in the following description is part by weight.

Measurement of Physical Properties

Test sheets were prepared by curing (press-curing) each silicone rubber composition at 165° C. for 10 minutes. Test sheets were also prepared by heat treating the press-cured test sheets at 200° C. for 4 hours. These sheets were evaluated for their physical properties including density, hardness (durometer A), tensile strength, elongation, rebound resilience, and compression set (150° C./22 hours, 25% compression) according to JIS K6249. Plasticity of the uncured silicone rubber compound before adding a curing agent thereto was also measured according to JIS K6249.

Example 1

A flask was charged with 3.9 parts of (C-1) dimethoxydimethylsilane and 1.1 parts of (C-2) water (1N hydrochloric acid diluted with ion exchanged water to a pH of 3.5), and the mixture was stirred at 25° C. for 20 minutes to prepare a uniform hydrolysate mixture (C).

(A) 100 parts of a straight chain organopolysiloxane (raw rubber) containing 99.850% by mole of dimethylsiloxane unit and 0.125% by mole of methylvinylsiloxane unit as the diorganosiloxane units constituting the backbone, and 0.025% by mole of dimethylvinylsiloxy group as the terminal group of the molecular chain, and having an average degree of polymerization of about 6,000

(B) 41 parts of wet silica (product name Nipsil LP manufactured by Tosoh Silica Corporation) having specific surface area as measured by BET of 200 $m^2/g$, and (C) the hydrolyzate mixture were blended at room temperature (25° C.) in a kneader, and the mixture was heat treated at 170° C. for 2 hours to produce a silicone rubber compound.

Then, 0.4 part of 2,5-dimethyl-2,5-bis(t-butylperoxy)-hexane was added as a crosslinking agent to 100 parts of the compound as described above to uniformly mix them, thereby obtaining a silicone rubber composition. Then, the thus obtained silicone rubber composition was press-cured at 165° C. for 10 minutes to prepare a test sheet. The test sheet was then subjected to post-curing at 200° C. for 4 hours to prepare a post-cured test sheet. The press-cured test sheet before the post-curing and the post-cured test sheet were evaluated for their physical properties. Plasticity of the uncured silicone rubber compound before adding the curing agent thereto was also measured.

Example 2

A silicone rubber compound and a silicone rubber composition were produced by repeating the procedure of Example 1 except that the amount of water used for hydrolysis was 2.2 parts. The silicone rubber composition was also evaluated by repeating the procedure of Example 1.

Example 3

A silicone rubber compound and a silicone rubber composition were produced by repeating the procedure of Example 1 except that the silica used was changed to 35 part of fumed silica (product name Aerosil 200 manufactured by Nippon Aerosil Co., Ltd.) having a specific surface area (BET) of 200 $m^2/g$, the amount of dimethoxydimethylsilane was 5.7 parts, and the amount of water at pH 3.5 was 1.6 parts. The silicone rubber composition was also evaluated by repeating the procedure of Example 1.

Comparative Example 1

A silicone rubber compound and a silicone rubber composition were produced by repeating the procedure of Example 1 except that only dimethoxydimethylsilane was added without adding the hydrolyzate of the dimethoxydimethylsilane and water. The silicone rubber composition was also evaluated by repeating the procedure of Example 1.

Comparative Example 2

A silicone rubber compound and a silicone rubber composition were produced by repeating the procedure of Example 3 except that only alkoxysilane was added without adding the water. The silicone rubber composition was also evaluated by repeating the procedure of Example 1.

TABLE 1

|  | (parts by weight) | Example 1 | Example 2 | Example 3 | Comparative Example 1 | Comparative Example 2 |
|---|---|---|---|---|---|---|
| Formulation of the composition | (A) Organopolysiloxane | 100 | 100 | 100 | 100 | 100 |
|  | (B) Wet silica | 41 | 41 |  | 41 |  |
|  | (B) Dry silica |  |  | 35 |  | 35 |
|  | (C) Hydrolyzate | 5.0 | 6.1 | 7.3 |  |  |
|  | (C-1) Dimethoxydimethylsilane |  |  |  | 3.9 | 5.7 |
|  | (C-2) Water |  |  |  | 0 | 0 |
| Preparation of the composition | Formulation time (min) | 52 | 45 | 24 | 75 | 37 |
|  | Heat treatment temperature (° C.) | 170 | 170 | 170 | 170 | 170 |
|  | Heat treatment time (hr) | 2 | 2 | 2 | 2 | 2 |
| Evaluation of the physical properties | Press-cure Density (g/cm³) | 1.15 | 1.15 | 1.14 | 1.15 | 1.14 |
|  | Hardness | 50 | 49 | 51 | 48 | 50 |
|  | Tensile strength (MPa) | 8.9 | 8.8 | 10.6 | 8.5 | 10.5 |
|  | Elongation (%) | 360 | 380 | 520 | 330 | 500 |
|  | Rebound resilience (%) | 71 | 70 | 66 | 72 | 68 |
|  | Compression set (150° C., 22 hr) | 18 | 19 | 23 | 28 | 36 |
|  | Post-cure Hardness | 50 | 49 | 52 | 52 | 54 |
|  | Hardness difference (post-cure hardness – press-cure hardness) | 0 | 0 | 1 | 4 | 4 |
|  | Tensile strength (MPa) | 7.8 | 8.2 | 10.8 | 7.2 | 10.2 |
|  | Elongation (%) | 290 | 300 | 460 | 250 | 440 |
|  | Rebound resilience (%) | 69 | 68 | 70 | 68 | 69 |
|  | Compression set (150° C., 22 hr) | 8 | 7 | 8 | 13 | 15 |
|  | Plasticity Initial | 250 | 246 | 229 | 255 | 270 |
|  | After 1 day (40° C.) | 295 | 290 | 255 | 334 | 328 |
|  | Change in the plasticity (Initial plasticity – plasticity after 1 day) | 45 | 44 | 26 | 79 | 58 |

Japanese Patent Application No. 2011-100530 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method for producing a silicone rubber compound comprising the steps of mixing the components (A) to (C):

(A) 100 parts by weight of an organopolysiloxane having a degree of polymerization of at least 100 represented by the following average compositional formula (I):

$$R^1_a SiO_{(4-a)/2} \quad (I)$$

wherein $R^1$ is independently a substituted or unsubstituted monovalent hydrocarbon group, and a is a positive number of 1.95 to 2.05, (B) 5 to 100 parts by weight of a reinforcing silica having a specific surface area as measured by BET absorption method of at least 50 m²/g, and (C) a preliminary hydrolysis product of (C-1) 0.1 to 20 parts by weight of an alkoxysilane represented by the following formula (II):

$$R^2_m Si(OR^3)_{4-m} \quad (II)$$

wherein $R^2$ is independently hydrogen atom or a substituted or unsubstituted monovalent hydrocarbon group, $R^3$ is independently a substituted or unsubstituted alkyl group, and m is 0, 1, 2, or 3, and (C-2) water at a molar amount 0.3 to 5 times the amount of the alkoxy group in the alkoxysilane of the component (C-1), and subjecting the mixture to a heat treatment.

2. A method for producing a silicone rubber compound according to claim 1 wherein the component (C-1) is a diorganodialkoxysilane.

3. A method for producing a silicone rubber compound according to claim 2 wherein the component (C-1) is a dimethoxydimethylsilane.

4. A method for producing a silicone rubber compound according to claim 1 wherein the water component (C-2) is an acidic aqueous solution having a pH of 1.0 to 5.0.

5. A method for producing a silicone rubber composition comprising mixing a curing agent capable of curing the component (A) to the silicone rubber compound obtained by the method of any one of claims 1 to 4.

6. The method for producing a silicone rubber composition according to claim 5 wherein the component (A) is an organopolysiloxane having at least two alkenyl groups and the curing agent is an organic peroxide.

7. The method for producing a silicone rubber composition according to claim 5 wherein the component (A) is an organopolysiloxane having at least two alkenyl groups and the curing agent is a combination of an organohydrogenpolysiloxane having at least two hydrogen atoms directly bonded to silicon atoms and a platinum metal-based hydrosilylation catalyst.

8. A silicone rubber compound produced by the method of claim 1.

9. A silicone rubber composition produced by the method of claim 5.

* * * * *